United States Patent
Zieger et al.

(10) Patent No.: US 8,662,283 B2
(45) Date of Patent: Mar. 4, 2014

(54) COMPACT SPRING TENSIONER FOR BELT CLEANERS

(75) Inventors: Andrew J. Zieger, Grand Rapids, MI (US); Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 335 days.

(21) Appl. No.: 13/035,783

(22) Filed: Feb. 25, 2011

(65) Prior Publication Data

US 2011/0209969 A1 Sep. 1, 2011

Related U.S. Application Data

(60) Provisional application No. 61/308,837, filed on Feb. 26, 2010.

(51) Int. Cl.
*B65G 45/16* (2006.01)

(52) U.S. Cl.
USPC .......................................... 198/499

(58) Field of Classification Search
USPC .......................... 198/496, 497, 499
See application file for complete search history.

(56) References Cited

U.S. PATENT DOCUMENTS

| | | | |
|---|---|---|---|
| 836,702 A * | 11/1906 | Ostendorff | 261/110 |
| 2,700,904 A | 2/1955 | Woods | |
| 4,354,396 A | 10/1982 | Charles | |
| 4,632,015 A | 12/1986 | Wilson | |
| 4,633,999 A * | 1/1987 | Perneczky | 198/499 |
| 4,795,024 A | 1/1989 | Eatwell | |
| 5,007,524 A * | 4/1991 | Morefield | 198/499 |
| 5,248,026 A * | 9/1993 | Morefield | 198/499 |
| 5,865,997 A | 2/1999 | Isaacs | |
| 6,056,112 A * | 5/2000 | Wiggins | 198/499 |
| 6,283,274 B1 * | 9/2001 | Dolan et al. | 198/499 |
| 6,360,875 B1 * | 3/2002 | Altemus et al. | 198/499 |
| 7,216,756 B2 * | 5/2007 | Swinderman | 198/499 |
| 7,383,940 B1 * | 6/2008 | Stumpf et al. | 198/499 |
| 7,549,532 B2 | 6/2009 | Ostman | |
| 7,565,962 B2 * | 7/2009 | Thew | 198/497 |
| 7,819,237 B2 * | 10/2010 | Felton | 198/499 |
| 8,201,682 B2 * | 6/2012 | DeVries | 198/499 |
| 8,312,986 B2 * | 11/2012 | DeVries et al. | 198/497 |
| 8,393,459 B2 * | 3/2013 | Childs et al. | 198/497 |
| 2008/0251358 A1 | 10/2008 | Thew | |
| 2009/0272625 A1 | 11/2009 | DeVries et al. | |
| 2010/0230241 A1 | 9/2010 | Felton | |

OTHER PUBLICATIONS

Notification of Transmittal of the International Search Report and the Written Opinion of the International Searching Authority, or the Declaration from the International Bureau of WIPO for International Application No. PCT/US2011/026320 dated Apr. 18, 2011, 10 pages.

* cited by examiner

*Primary Examiner* — Douglas Hess
(74) *Attorney, Agent, or Firm* — Fitch, Even, Tabin & Flannery, LLP

(57) ABSTRACT

Compact spring tensioner devices are provided for biasing scraper blades toward a conveyor belt. The spring tensioner devices generally are constructed to have a reduced operational envelope and be reconfigurable for providing a selected one of opposite rotary bias forces.

22 Claims, 14 Drawing Sheets

COMPACT SPRING TENSIONER FOR BELT CLEANERS

CROSS REFERENCES TO RELATED APPLICATIONS

This patent claims benefit under 35 U.S.C. §119 (e) to U.S. Provisional Application No. 61/308,837 entitled "Compact Spring Tensioner For Belt Cleaners" filed Feb. 26, 2010, the contents of which are incorporated herein by reference in its entirety.

FIELD OF THE INVENTION

The invention relates to a spring tensioning apparatus for a conveyor belt system, and more particularly to a compact reconfigurable rotary spring tensioner for a belt cleaning apparatus and method for installing the spring tensioner.

BACKGROUND OF THE INVENTION

Conveyor belts are used in a variety of industries (e.g., coal, aggregate, packaging) to transport goods and materials. Based on the material transported and the ambient conditions surrounding the conveyor belt, material can become undesirably affixed to the belt. The material can be removed from the belt in a number of ways, including, but not limited to the use of a belt cleaning apparatus utilizing spring tensioners.

A belt cleaning apparatus cleans the belt in place, during operation, via a scraping action thereagainst. A belt cleaning apparatus typically will include a cleaner blade or blades having a scraper or tip end that is biased into engagement with the belt surface, usually on the return run of the belt (secondary belt cleaners) or at the head pulley (primary belt cleaners). In either type of belt cleaner, the scraper blade will typically be mounted to an elongate pole extending below and across the belt to the frame structure of the conveyor system on either side of the belt for being operatively supported thereby. In this regard, one or both of the opposite ends of the pole can be mounted to biasing units secured to frame structures for providing a rotary bias force for urging the scraper blade into engagement with the belt surface.

Rotary spring tensioners generally include a collar secured to the elongate pole to which the belt scraper blades are attached. A lever arm extends from the collar and is configured to be connected to a spring device. Compression of a spring of the spring device creates a spring force vector which creates a moment about the elongate pole, thereby urging the scraper blades mounted on the pole into engagement with the conveyor belt.

The belt scraper blades of the belt cleaner are configured to wear over their useful life. One method of measuring the wear of the belt cleaner blades is a wear angle. The wear angle corresponds to the rotation of the elongate pole required to maintain tight engagement of the scraper blades against the conveyor belt. Scraper blades which are operable with a large wear blade angle are desirable as they have a longer useful life, which reduces the replacement frequency. Some prior art scraper blades have a useful life up to a wear blade angle of about 30 degrees.

As the scraper blades wear, the elongate pole rotates to maintain contact between the scraper blades and the conveyor belt. Rotation of the elongate pole results in a corresponding decompression of the spring, resulting in a lower spring force being applied to the lever arm. Over the useful life of the scraper blades, the spring tensioner must be retensioned to provide the appropriate moment about the elongate pole and thereby maintain engagement of the scraper blades with the conveyor belt. Retensioning includes recompressing the spring of the spring device to increase the spring force applied on the lever arm so that the cleaning blades are appropriately spring loaded into engagement with the belt.

Due to the rotation of the elongate pole, the position of the lever arm changes relative to the spring force vector. In turn, the efficiency of the transmission of the spring force to produce a moment about the elongate rod is affected. The efficiency of a rotary spring tensioner is measured by the transmission of force applied by the spring member into a moment about the elongate pole. In particular, the moment about the elongate pole is a function of M=lF sin Θ, wherein l is the lever arm length, F is the magnitude of the force applied by the spring, and Θ is the included angle between the axis of the lever arm and the vector of the force being applied on the lever arm by the spring. As such, the most efficient transmission of force is achieved when the angle between the lever arm and the force vector is 90°. As the angle increases or decreases from 90°, the spring force is less efficiently applied to the elongate pole secured by the collar.

Some prior art spring tensioners attempt to maintain the lever arm-spring force vector angle close to 90 degrees by varying the lever arm length during operation of the spring tensioner. An exemplary tensioner, such as the FLEXCO EST spring tensioner, includes a rod of the spring device extending from a fixed pivot on the mounting bracket. The rod extends through a closed slot extending along the lever arm. Mounted on the rod and engaging the lever arm is a spring. As the lever arm rotates due to blade wear, the rod shifts along the lever arm slot toward the distal end of the lever arm, thereby maintaining an angle of approximately 90 degrees between the lever arm axis and the spring force vector.

To accommodate the travel of the lever arm over the useful life of the scraper blade, the overall size of the rotary spring tensioner has to be configured to provide a lever arm slot long enough to maintain a spring force vector-lever arm axis angle of generally 90 degrees. As a result, the spring tensioner occupies a large volume during operation, in particular due to rotation of the lever arm and the movement of the spring rod along the lever arm slot to maintain a generally 90 degree angle between the lever arm axis and the spring force vector.

The space requirements of a spring tensioner are a function of the physical dimensions of the tensioner and the operational volume or envelope the spring tensioner occupies during operation. In particular, the operational volume or envelope includes the space occupied by both the lever arm and the spring assembly during operation. Some prior art spring tensioners reduce the operational volume by limiting the rotation of the collar and lever arm. More particularly, some prior art spring tensioners limit the angular rotation of the lever arm to an amount that may be less than the maximum useful wear angle of a particular scraper blade.

One known commercial tensioner is provided by ASGCO. The ASGCO Force-1 spring tensioner includes a collar having a lever arm extending away from the elongate pole. The ASGCO FORCE-1 spring tensioner includes spaced flanges of the mounting plate between which the lever arm extends and which limit the rotation of the lever arm. A spring rod extends from the lever arm and through an opening in one of the spaced flanges. The spring is mounted on the spring rod against the outer surface of the flange having the spring rod extending therethough.

The flanges of the ASGCO FORCE-1 spring tensioner are spaced to provide about a 22 degree rotation of the lever arm. By including two flanges, the mounting bracket allows for reconfiguration of the lever arm and spring device between providing a clockwise moment about the elongate pole and providing a counterclockwise moment about the elongate pole. In particular, the spring tensioner is reconfigured between providing clockwise and counterclockwise moments by removing the lever arm from the elongate pole, repositioning the lever arm and spring device to reverse their orientation, and then resecuring the lever arm to the elongate pole.

To minimize deviation of the angle between the lever arm axis and the spring force vector from about 90 degrees, the rod is not fixed to the flange of the mounting plate. Instead, as the lever arm rotates, the rod can translate and/or rotate to minimize deviation of the angle from about 90 degrees. However, even with limiting the movement of the lever arm, the spring tensioner still occupies a large operational volume or envelope due to the movement of the spring rod. In particular, as the elongate pole rotates due to blade wear, the lever arm shifts toward the spaced flange through which the spring rod extends. As the lever arm shifts closer to the flange, the spring rod translates relative to the mounting plate and extends further beyond the outer surface of the mounting plate flange. In addition, the spring rod rotates to minimize deviation of the angle from about 90 degrees, thereby increasing the operational envelope of the ASGCO FORCE-1 spring tensioner.

Further, as a result of limiting the rotation of the lever arm, a more complex retensioning process including repositioning of the lever arm may be required to accommodate the useful life of the scraper blades. In particular, once the lever arm can no longer rotate, the spring tensioner can not provide the necessary torque to the elongate pole to maintain the desired bias force on the scraper blades for engaging the conveyor belt. Therefore, an operator must decouple the collar from the elongate pole and rotate the collar to a position at or near the initial or starting position of the lever arm. The collar can later be repositioned again as necessary depending on the available lever arm rotation and the useful life of the scraper blade.

SUMMARY OF THE INVENTION

In accordance with the present invention, a spring tensioner apparatus is provided which occupies a small amount of space during conveyor belt operation. The spring tensioner apparatus includes a collar member secured to an elongate pole member for having scraper blades mounted thereto. Extending from the collar member is a lever arm or lever arm portion for being engaged by a spring assembly. An end of the spring assembly is pivotably connected to a mounting bracket or plate with the pivoting spring assembly end being fixed against translation.

An arcuate interface between the spring assembly and lever arm allows the lever arm to rotate relative to the spring assembly. As a result, the spring assembly has limited pivotable movement about the fixed pivot connection as the lever arm rotates during conveyor belt operation. Further, by fixing one end of the spring assembly to the mounting plate, the spring assembly does not translate during conveyor belt operation and is instead limited to pivoting about the fixed pivot connection. As a result, the volume which the spring tensioner, and in particular the spring assembly, occupies during operation is reduced.

In another aspect, a spring tensioner apparatus is provided that is simpler and easier to mount. In this regard, the spring tensioner apparatus includes a collar member having a split lever arm. The split lever arm has spaced end portions configured to receive a rod member therebetween with the rod member being pivotably connected to a mounting bracket. A spring seat member and spring member are disposed about the rod member. The spring seat member and end portions of the lever arm are configured to engage each other with an arcuate interface therebetween to permit the lever arm and spring seat member to shift relative to one another during operation of the spring tensioner apparatus.

An interfering portion of the spring seat member acts to maintain the rod member between the spaced end portions of the lever arm. As a result, the lever arm can include a slot having an open distal end configured to allow the rod member to be pivoted into the slot. This provides for easy installation of the spring tensioner apparatus as the spring member and spring seat member can be mounted to the rod member at any time, including before the collar member is secured to the elongate pole. In comparison, prior art spring tensioners require a similar rod member to be advanced through an opening in the lever arm before the collar is secured to the elongate pole, so that the rod member, collar member and lever arm can be installed as a single unit. Alternatively, some prior art spring tensioners require the rod to be advanced through a lever arm slot and then, with the lever arm and collar secured to the elongate pole, connected to mounting bracket.

In another aspect of the invention, a tensioning assembly of a belt cleaning mechanism is provided that is easily reconfigurable between a first orientation providing a clockwise rotary force on the pole or support member to which a conveyor belt cleaner is to be mounted and a second orientation providing a counterclockwise rotary force on the pole or support member. In this regard, changing the configuration of the tensioning assembly does not rewire significant disassembly of the tensioning assembly for reconfiguration thereof.

The spring tensioning assembly includes a pivot connection between a mounting bracket and a spring rod. The pivot connection is configured to allow for pivoting of the spring rod and a spring member mounted on the spring rod between the first orientation providing a clockwise force on the pole and the second orientation providing a counterclockwise force on the pole. In contrast, prior art spring tensioners require significant disassembly to change the direction of the rotary force. In some prior spring tensioners, the spring rod and spring member would be completely disconnected from the lever arm and mounting plate and reconnected in an alternative configuration to provide the opposite rotary force. In other spring tensioners, the collar including the lever arm extending therefrom, spring rod and spring member would all be removed from the mounting plate, reoriented and reinstalled to provide the opposite rotary force.

In another aspect of the invention, a method of installing a spring tensioning apparatus is provided. The method includes pivotably connecting an elongate spring support mount to a mounting bracket. The mounting bracket is then secured to a conveyor frame structure adjacent the conveyor belt. A collar is then mounted to an elongate mounting pole of the belt cleaner. The collar includes an open-ended split lever arm which defines a slot and is configured to receive the elongate spring mount. With the collar and mounting bracket in place, the elongate spring mount is pivoted through the open end of the split lever arm and into the slot of the lever arm.

In another aspect of the invention, a method of replacing scraper blades secured to an elongate pole is provided in a fast and easy manner. The scraper blades are urged into engagement with a conveyor belt by a rotary spring tensioner connected to the elongate pole. The method includes decompressing a spring mechanism of the spring tensioner. After the spring mechanism is decompressed, the decompressed spring mechanism is pivoted away from a lever arm secured to the elongate pole. The elongate pole with the lever arm secured thereto are then rotated so that the scraper blades are shifted away from the belt to allow for removal of the blades from their mountings to the elongate pole.

This provides an advantage over the prior art which may require the removal of all or a part of the spring mechanism in order to rotate the elongate pole sufficiently to remove the scraper blades. Additionally, rotating the elongate pole with the lever arm secured thereon provides an advantage over some prior art tensioners which require that the lever arm be unsecured from the elongate pole to allow for sufficient pole rotation. In particular, decoupling the lever aim from the elongate pole to allow for rotation of the elongate pole independent of the lever arm requires an operator to later recouple the lever arm in the correct orientation. Incorrect orientation of the lever arm may result in a reduced available range of motion of the lever arm and inefficient transmission of the spring force to the elongate pole member.

DETAILED DESCRIPTION OF THE PREFERRED EMBODIMENTS

Figure 1:
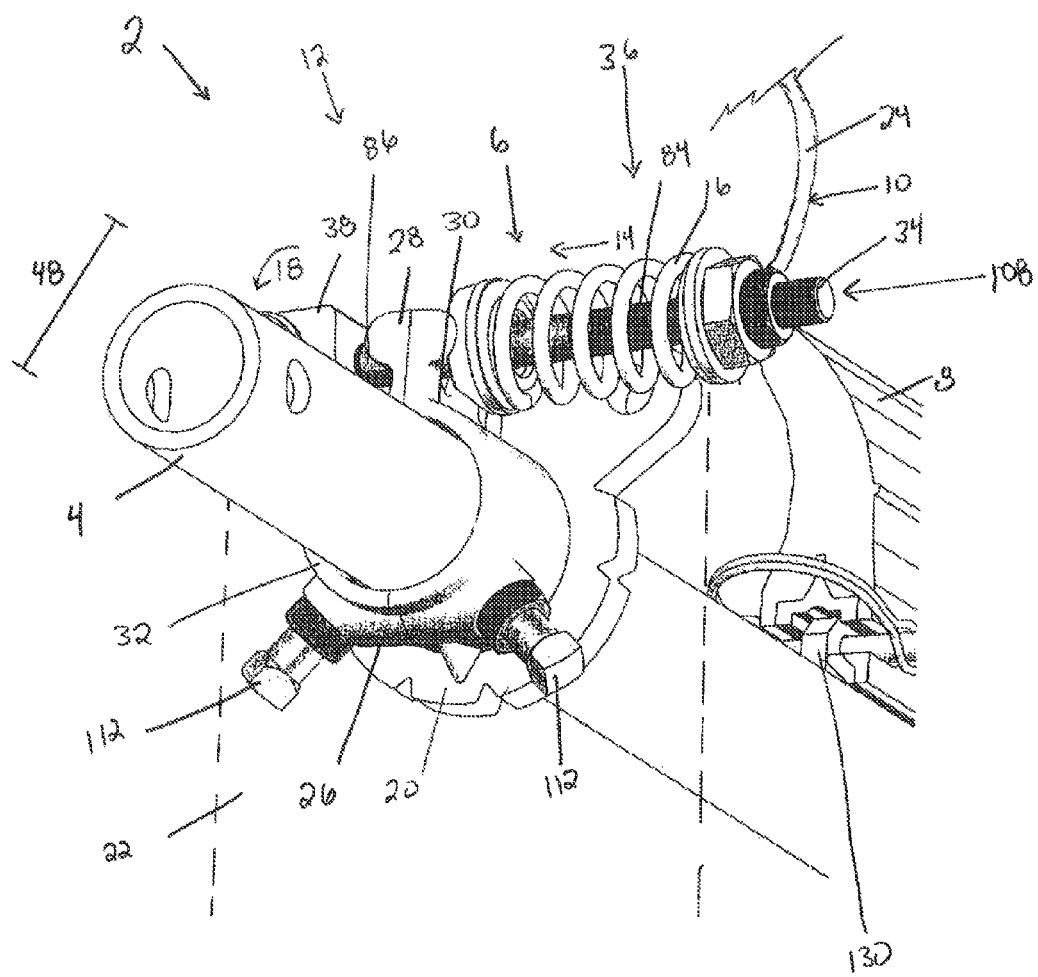
FIG. 1 is a perspective view of a rotary spring tensioner of the present invention mounted on an elongate pole and configured to provide a counterclockwise rotary force on an elongate pole for a belt cleaning apparatus with the conveyor frame structure shown in phantom.

In FIG. 1, a belt cleaning system 2 is shown having an elongate support member 4 having a spring tensioner or tensioner apparatus 6 mounted thereon. The belt cleaning system 2 further includes cleaner blades 8 mounted to the elongate support member 4 configured to engage a belt surface 10. As shown, the spring tensioner 6 is configured to have a compact configuration 12 and efficiently transfer the spring tensioning force 14 provided by a compressed spring member 16 into a rotary force 18 applied onto the elongate support member 4. Further advantages of the spring tensioner 6 include simplified installation and retensioning processes and an easy reconfiguration of the spring tensioner 6 between providing a clockwise rotary force and a counter-clockwise rotary force to the elongate support member 4.

Figure 4:
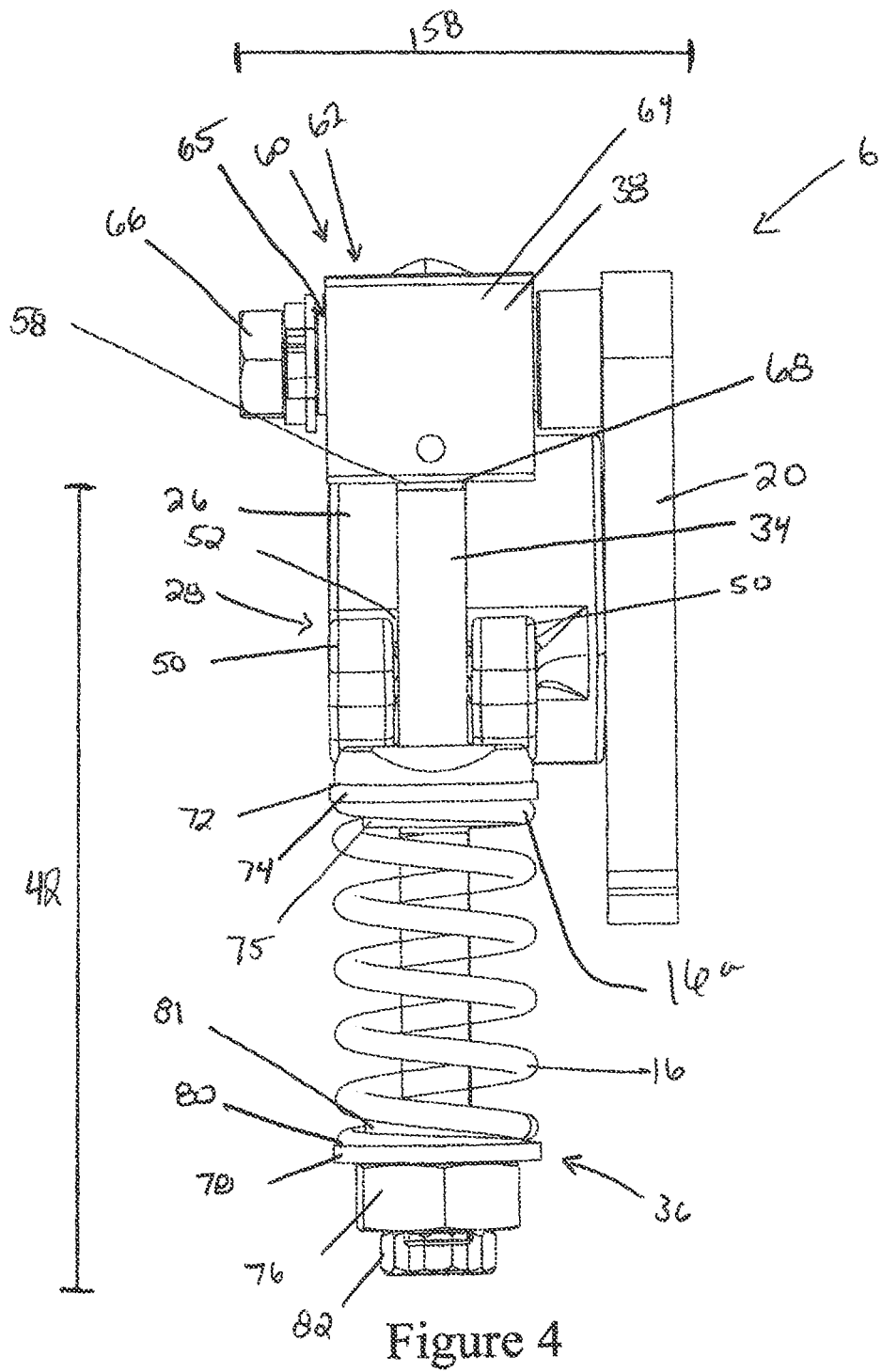
FIG. 4 is a top plan view of the rotary spring tensioner of FIG, 1 showing a spring rod of the spring tension mechanism positioned between spaced distal end portions of the collar lever arm.
Figure 5:
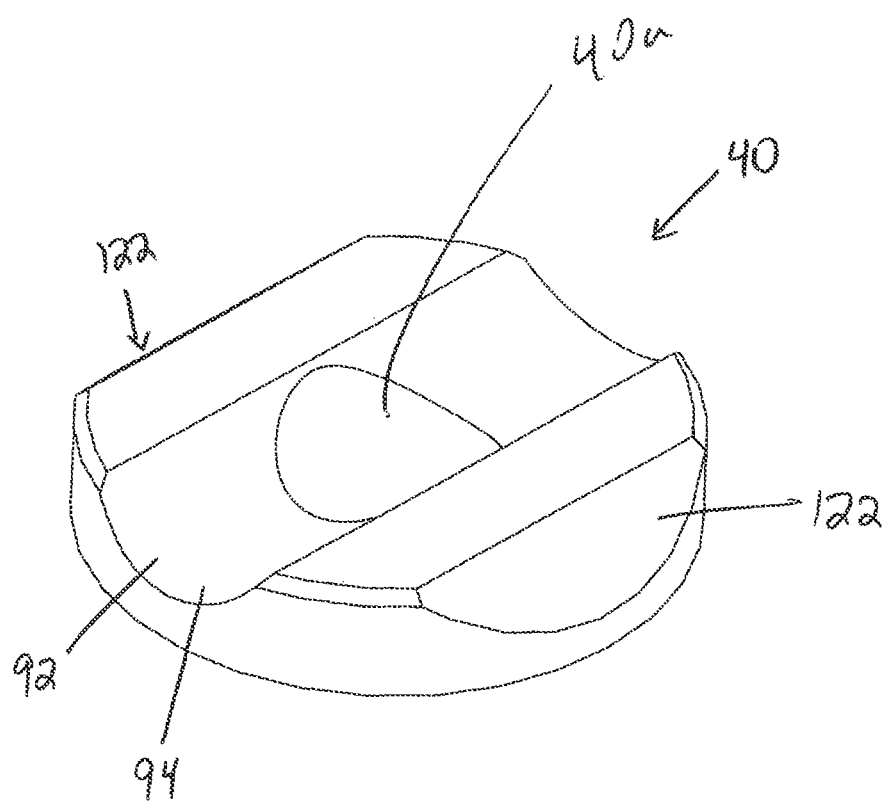
FIG. 5 is a perspective view of a spring seat member of the rotary spring tensioner of FIG. 1 showing chamfered edges along a front surface and an arcuate groove extending into the front surface.
Figure 6:
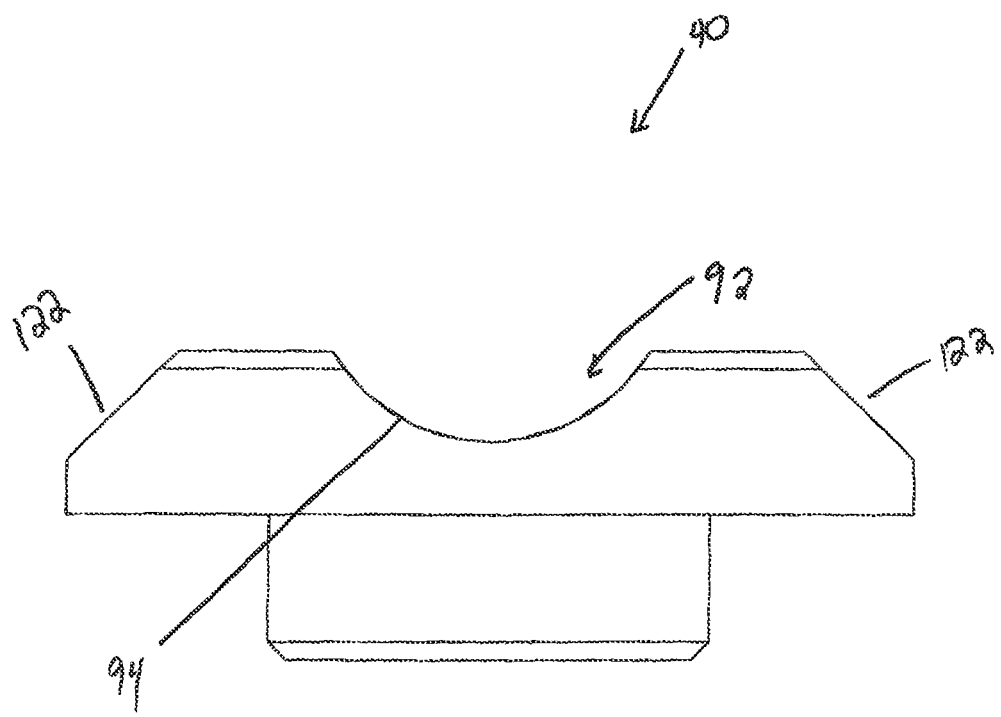
FIG. 6 is an elevational view of the spring seat member of the rotary spring tensioner of FIG. 1 showing the chamfered upper edges of the front surface of the spring seat member and the radius of curvature of the arcuate groove.

As shown in FIG. 1, the spring tensioner 6 includes a mounting bracket or plate 20 for being mounted to a conveyor frame structure 22 alongside a conveyor belt 24. A collar member 26 is secured to the elongate pole member 4. A lever arm 28 extends from an outer surface 30 of a tubular portion of the collar member 26. A spring rod 34 of a spring assembly 36 connects to a mounting block 38 and extends therefrom a fixed distance 42 (FIG. 4). A spring seat member 40 on the spring rod 34 engages the lever arm 28 with a spring member 16 providing a spring force 14 against the spring seat member 40 and urging the spring seat member 40 into engagement with the lever arm 28.

The lever arm or lever arm portion 28 extends radially from an outer surface 30 of a tubular portion 32 of the collar member 26. As shown in FIGS, 2 and 7-14, the lever arm 28 has a short, compact configuration 44. The distance 46 the lever arm 28 extends from the outer surface 30 of the collar member is preferably less than the outer diameter 48 of the elongate pole member 4 to which the collar 26 is secured. For example, the elongate pole member 4 can have an outer diameter 48 of about 1.90 inches, the collar can have an inner diameter 132 of about 2 inches and an outer diameter taken across the tubular outer surface 30 of about 2.4 inches, and the distance the lever arm 28 extends from the outer surface 30 of the collar 26 can be about 1.015 inches, the lever arm length being less than the outer diameter 48 of the elongate pole member 4. While the lever arm 28 is shown as being integral to the collar 26, it is contemplated that the lever arm 28 could comprise one or more members connected to the tubular portion 32 of the collar member 26.

An exemplary spring tensioner 6 includes a mounting plate or bracket 20 having a height 152 of 4.75 inches and a width 154 of 4.75 inches. The spring rod 34, when connected to the mounting bracket 20, can extend, for example, about 2 inches beyond the mounting bracket 20, resulting in an overall spring tensioner width 156 of about 6.72 inches. Further, an exemplary depth 158 of the combined mounting bracket 20 and collar 26 extending from the conveyor support structure 22 is about 3.06 inches.

Figure 7:
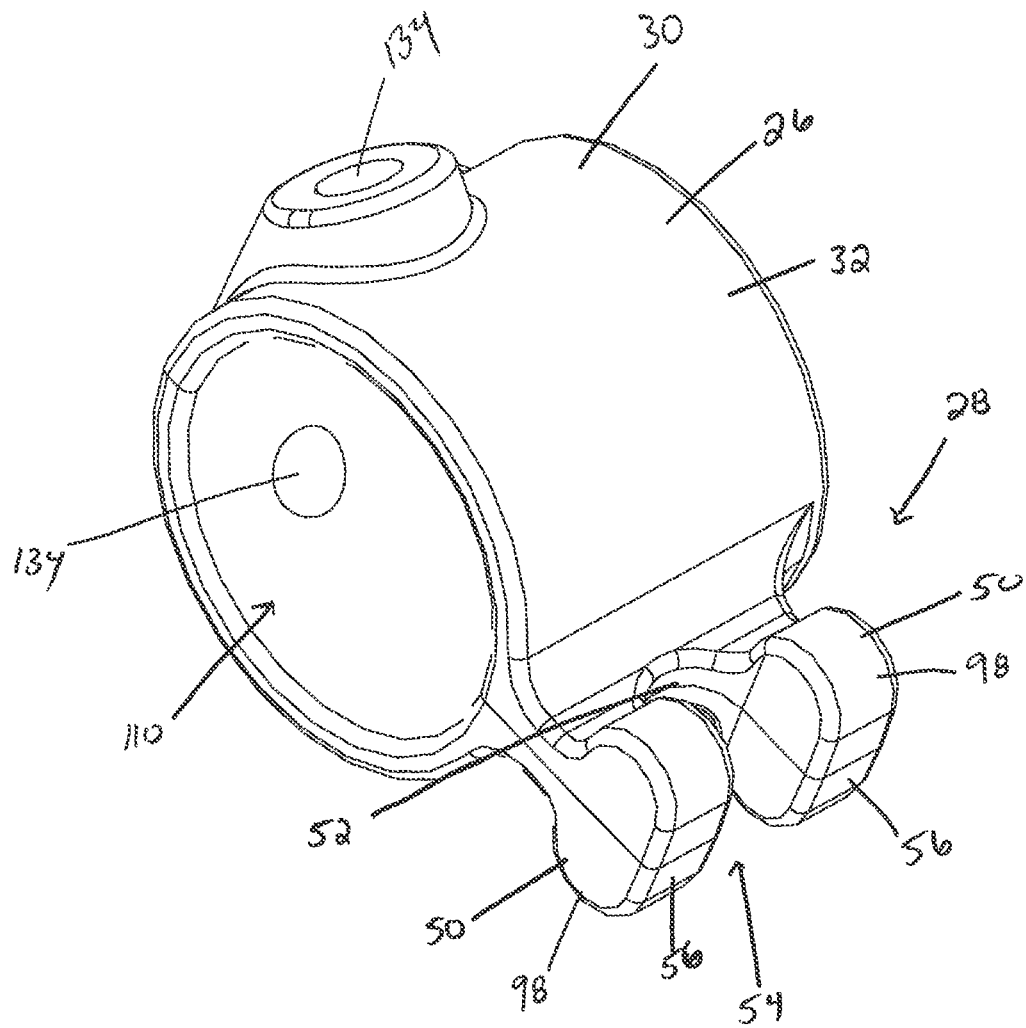
FIG. 7 is a perspective view of the collar of the rotary spring tensioner of FIG. 1 showing a tubular portion of the collar having an opening for receiving the elongate pole and the lever arm extending radially away from the tubular portion of the collar.
Figure 8:
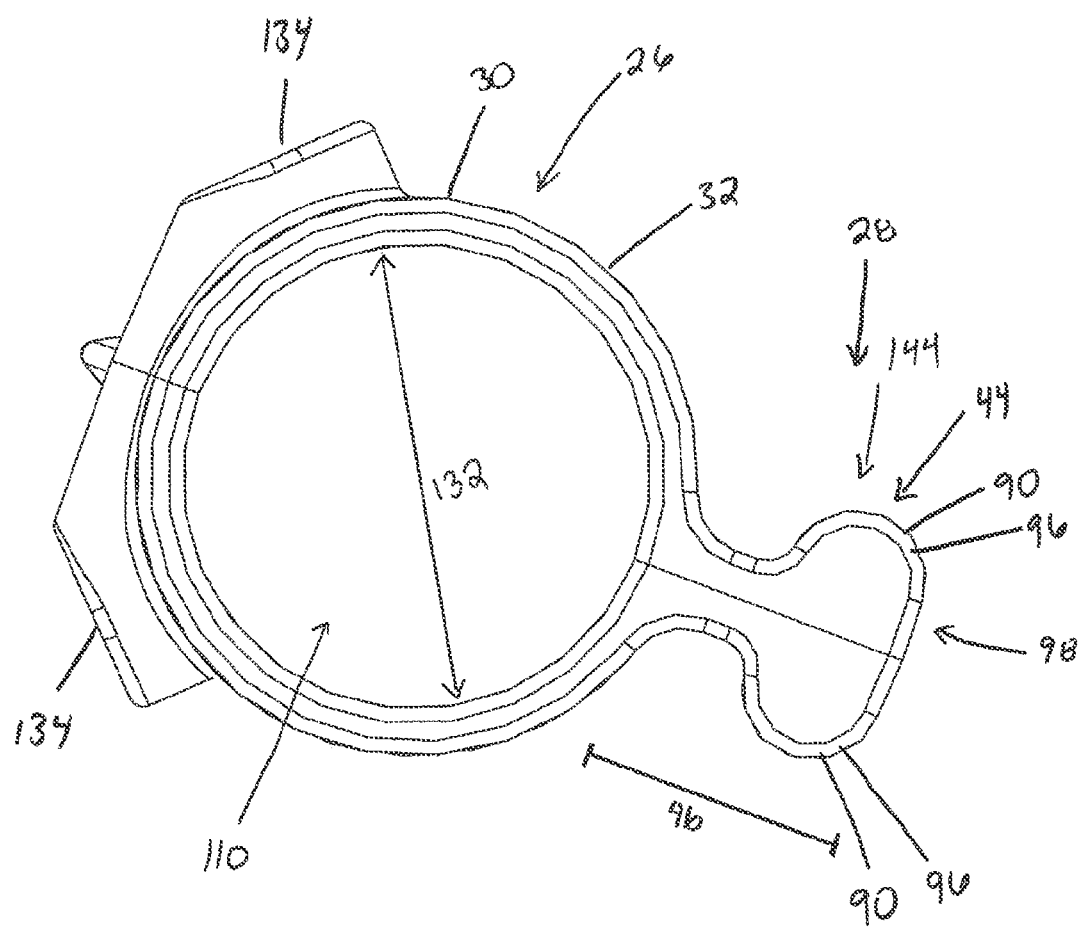
FIG. 8 is a front elevational view of the collar of the rotary spring tensioner of FIG. 1 showing an inner diameter of the tubular portion opening, the distance the lever arm extends from the outer surface of the collar tubular portion, and the arcuate configuration of the knuckle of one of the spaced distal end portions of the lever arm.
Figure 9:
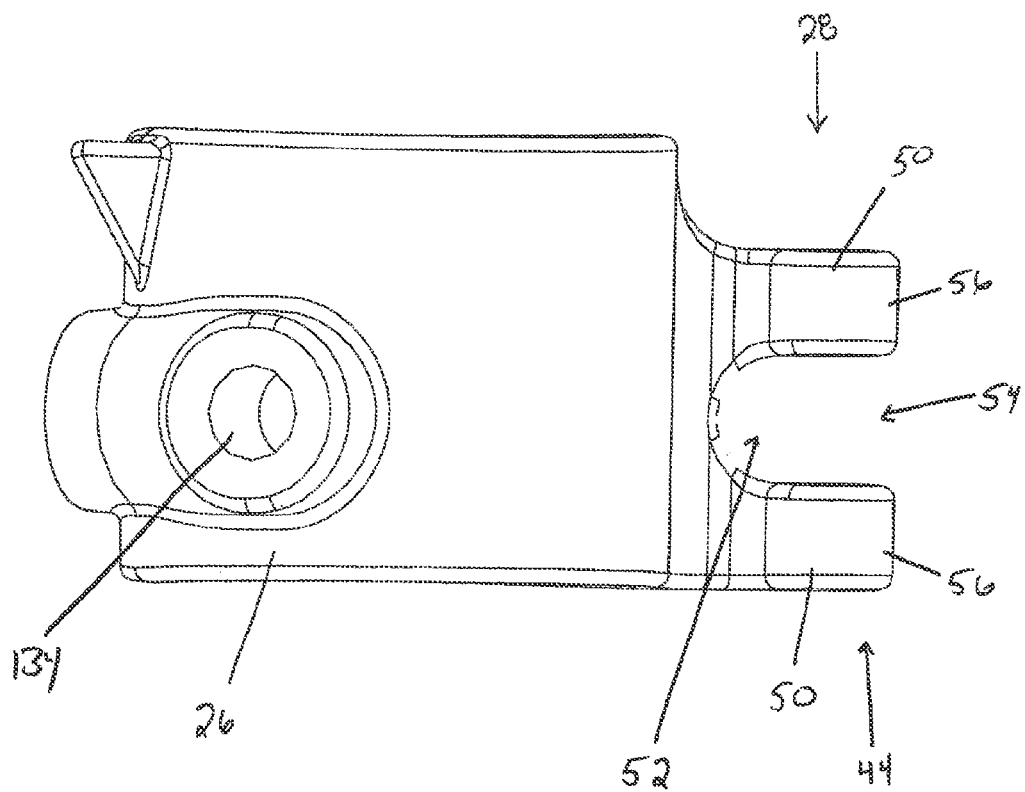
FIG. 9 is a top view of the collar of the rotary spring tensioner of FIG. 1 showing a slot defined by the spaced distal end portions of the lever arm.

Further, as best shown in FIGS. 4, 7 and 9, the lever arm 28 includes a pair of spaced distal end or free end portions 50 which define a slot 52 therebetween. The slot 52 has an open end 54 at ends 56 of the lever arm free end portions 50. The slot 52 and slot opening 54 are sized to receive the spring rod member 34 of the spring assembly 36.

Figure 10:
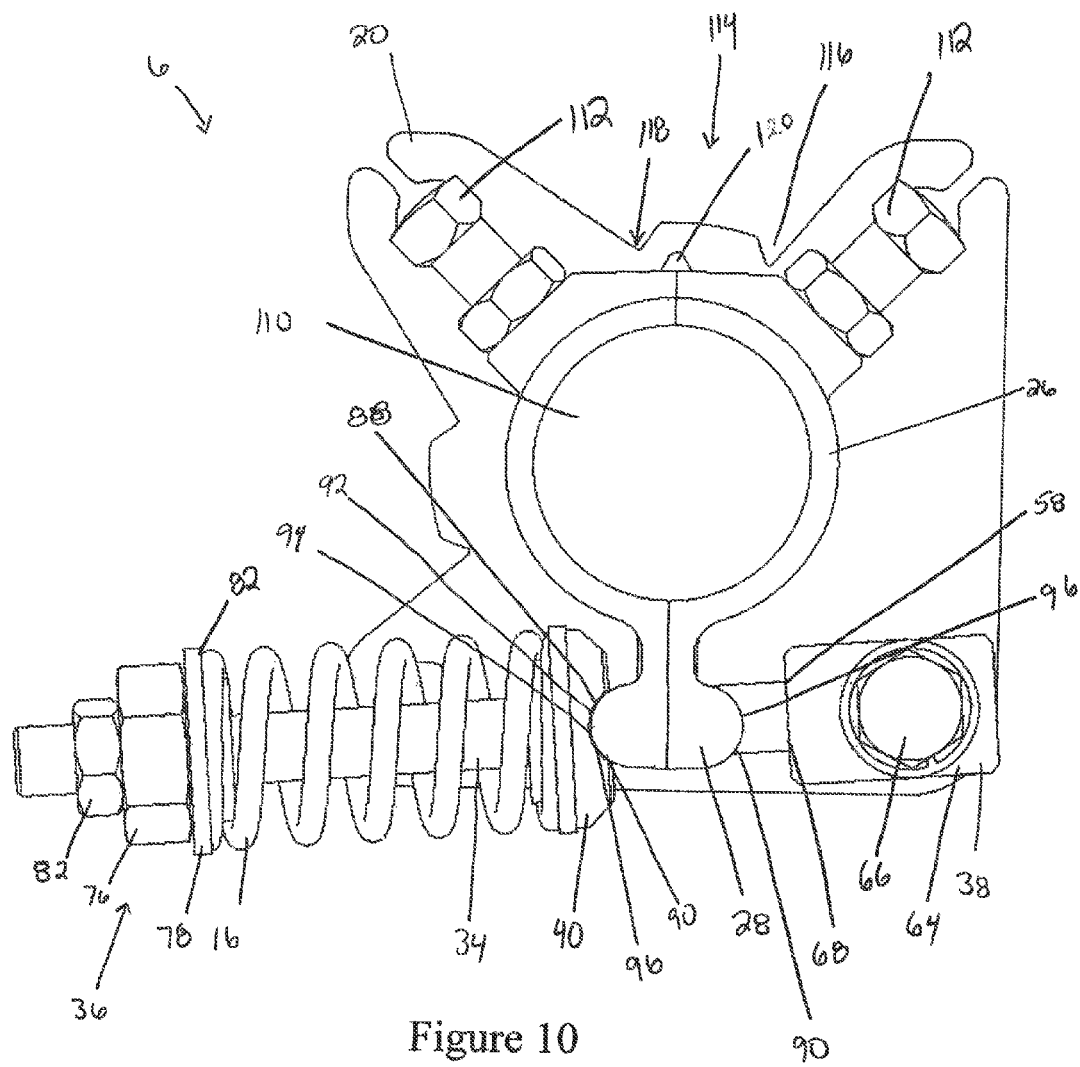
FIG. 10 is a front elevational view of the rotary spring tensioner of FIG. 1 showing the lever arm shifted to a position corresponding to partial wear of the scraper blades.
Figure 11:
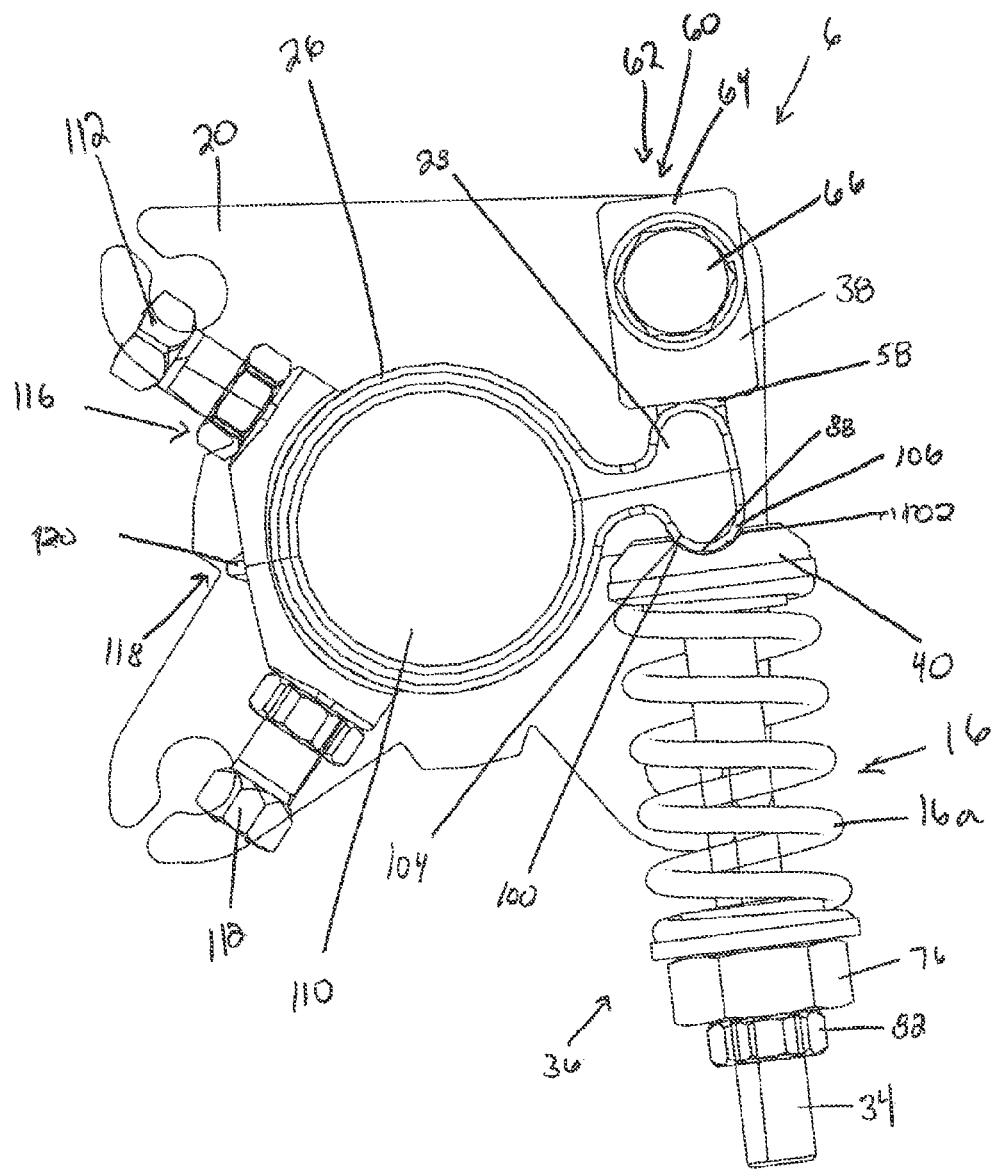
FIG. 11 is a front elevational view of the rotary spring tensioner of FIG. 1 showing the lever arm shifted toward the pivot block of the mounting bracket and corresponding to full wear of the scraper blades.
Figure 12:
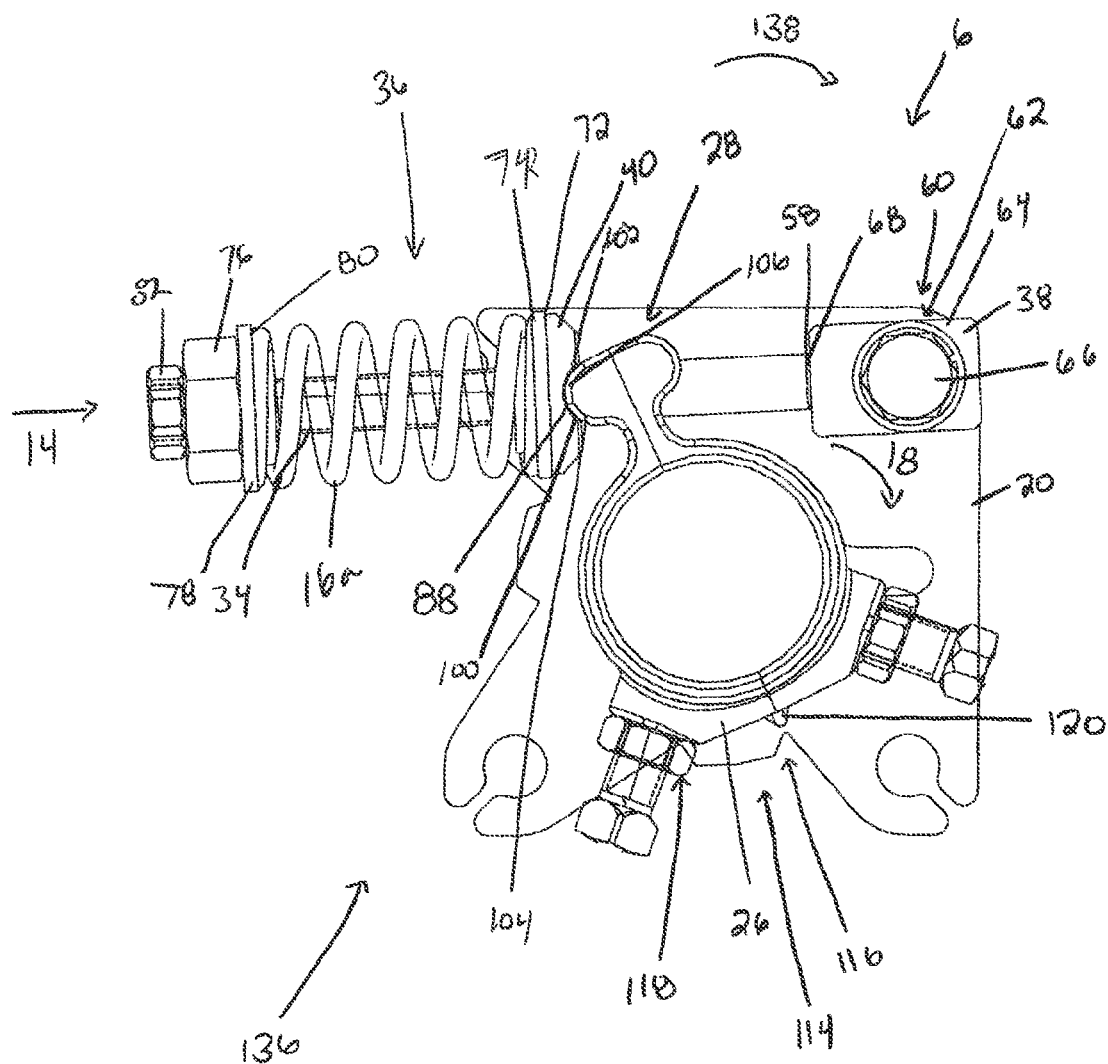
FIG. 12 is a front elevational view of the rotary spring tensioner of FIG. 1 configured to provide a clockwise rotary force on the elongate pole for a belt cleaning apparatus.
Figure 13:
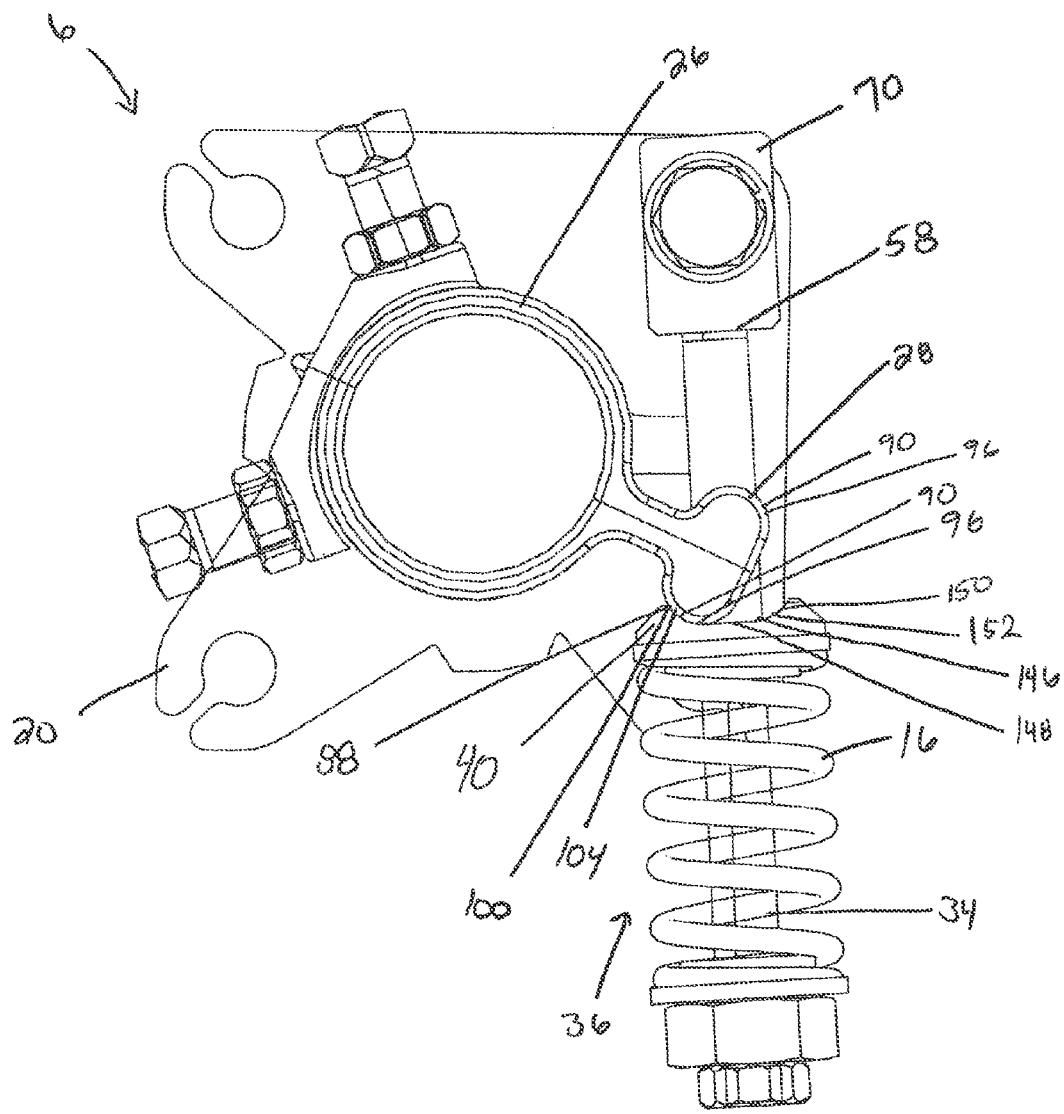
FIG. 13 is a front elevational view of a spring tensioner in another aspect of the invention showing a spring rod and a fixed, non-pivoting connection between the spring rod and the mounting bracket and an enlarged concave surface of the spring seat member for allowing rotation and shifting of the convex ends of the free ends of the lever arm in contact therewith.
Figure 14:
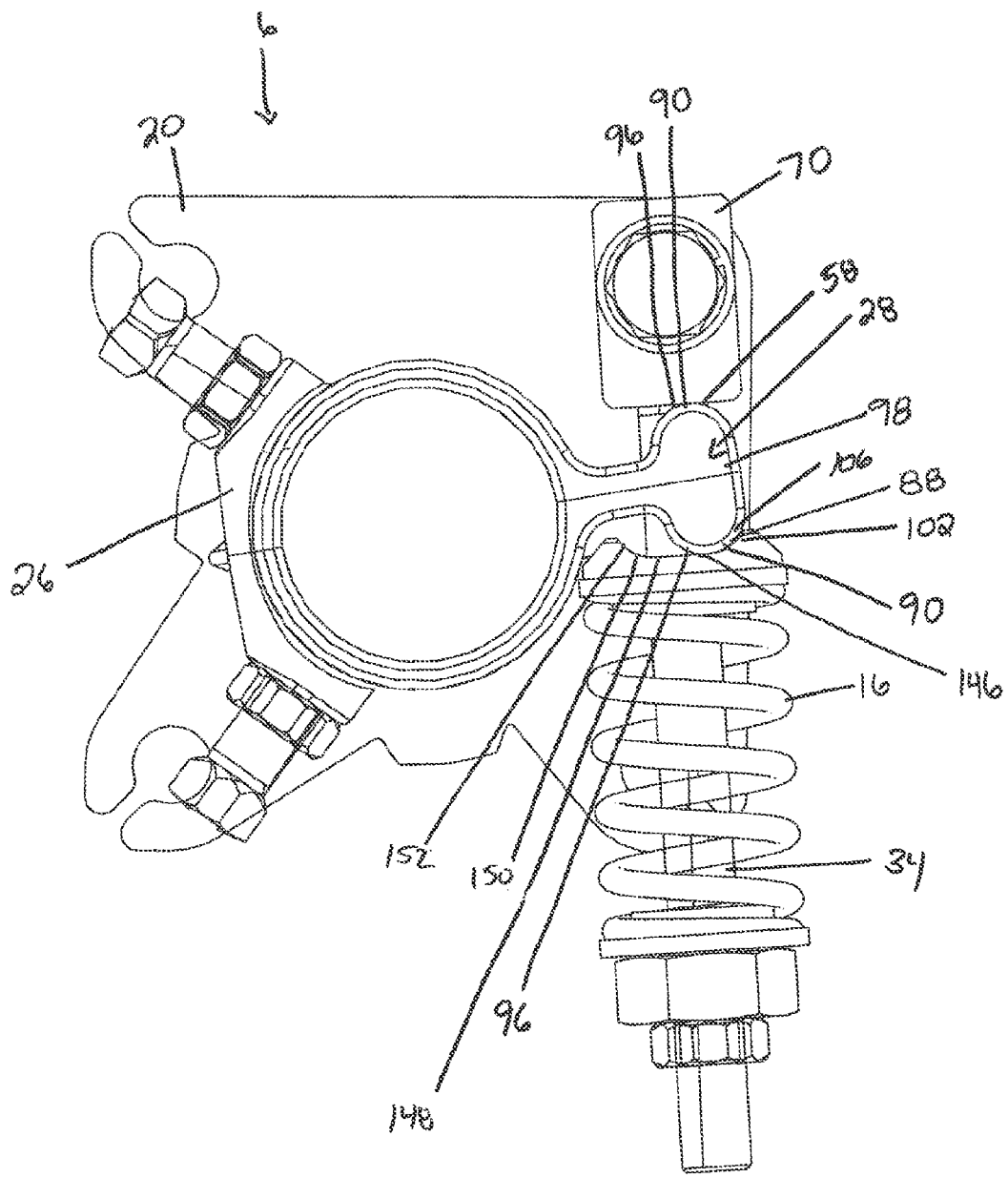
FIG. 14 is a front elevational view of the spring tensioner of FIG. 13 showing the elongate pole rotated to indicate scraper blade wear and the resulting repositioning of the engagement between the convex surfaces of the lever arm free ends and the concave spring seat member.

As shown in FIGS. 2 and 10-14, the spring rod 34 of the spring assembly 36 is securely connected at one end 58 to the mounting bracket 20. As a result, the spring rod 34 does not translate during operation of the spring tensioner 6. However, as shown in FIGS. 2 and 10-12, the spring rod 34 has a pivot connection 60 to the mounting bracket 20. Pivotably connecting the spring rod 34 to the bracket 20 allows the spring rod 34 to be pivoted into the lever arm slot 52 and out therefrom. As shown in FIGS. 12-14, the spring rod 34 can pivot about the pivot connection 60 between the mounting bracket 20 and spring rod 34 with the limits or stops being the collar 26 and/or the elongate pole member 4.

As shown in FIGS. 1, 2 and 10-12, a pivot mechanism 62 is attached to the mounting bracket 20 and provides the fixed pivot connection 60 between the spring rod 34 of the spring device or assembly 36 and the mounting bracket 20. The pivot mechanism 62 can include a pivot block 64 secured adjacent the mounting bracket 20 at a corner thereof. A securing member 66, such as a bolt, extends through a bushing or pivot sleeve 65 of the pivot block 64 and is secured to the mounting plate 20. While the securing member 66 does secure the pivot block 64 on the mounting bracket 20 against translation, the pivot sleeve 65 allows the pivot block 64 to pivot about the securing member 66 and relative to the mounting bracket 20. A threaded opening 68 of the pivot block 64 extends orthogonal to the securing member 66. The threaded opening 68 is configured to receive a threaded end 58 of the spring rod 34 therein. Alternatively, the opening 68 can include a smooth surface and the spring rod 34 could be secured by other means, such as a set screw (not shown).

In an alternative embodiment, as shown in FIGS. 13 and 14, the spring rod 34 can be connected to the mounting bracket by a fixed connection 70. More particularly, the orientation of the spring rod 34 can be fixed, such that the spring rod 34 does not translate or pivot during conveyor belt 24 operation.

With the spring rod 34 positioned between the free ends 50 of the lever arm 28, the spring member 16 disposed on the spring rod 34 with the coils 16*a* thereof extending about the rod 34 can be compressed to provide the spring force 14 on the lever arm 28. The spring member 16 is sized to provide the appropriate spring force 14 for a given lever arm length 46. More particularly, the spring member 16 is preferably selected to have a high spring constant, K, so that the overall size of the spring 16 and the spring rod 34 may be reduced thereby reducing the overall profile of the rotary spring tensioner 6.

Figure 2:
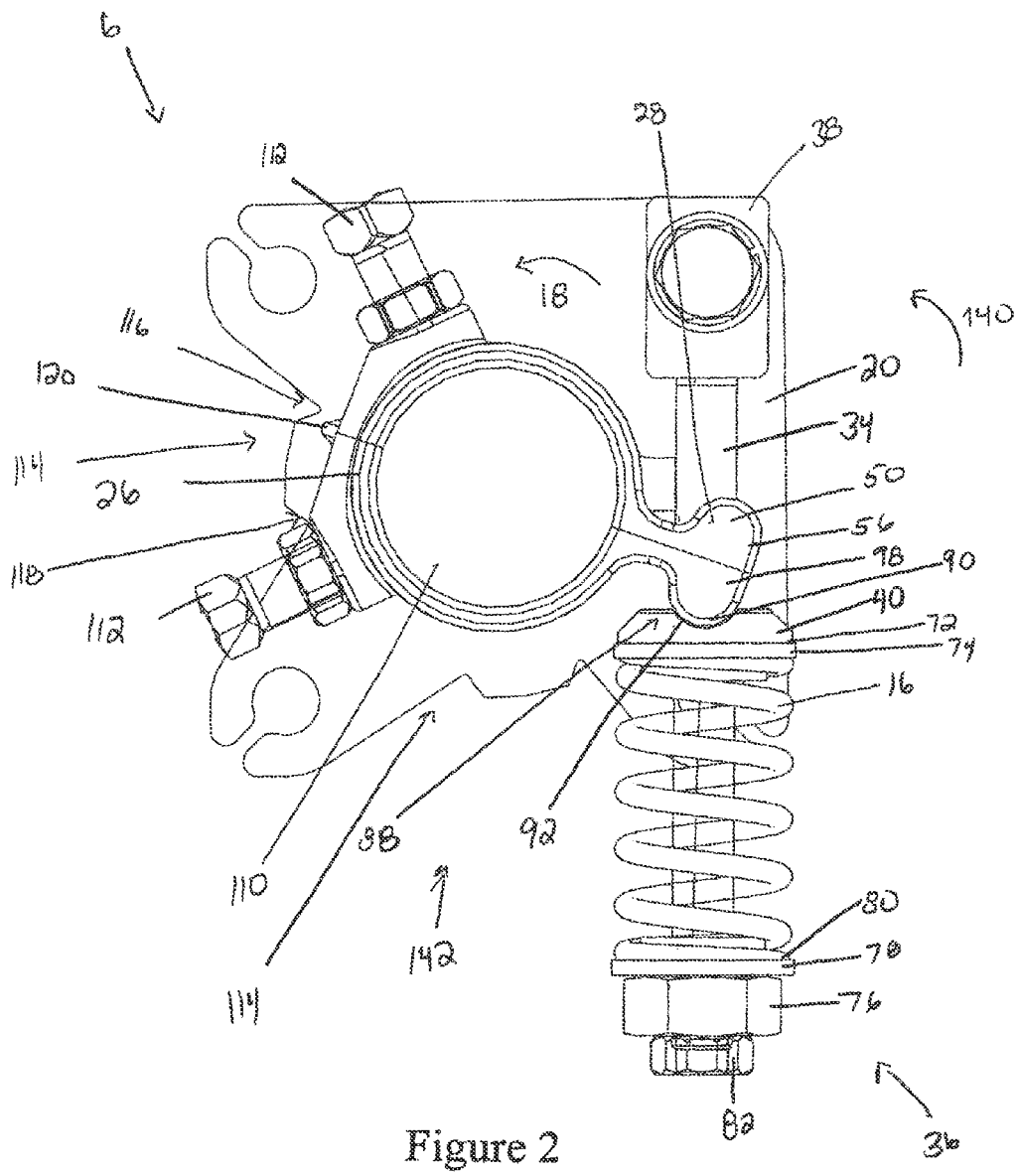
FIG. 2 is a front elevational view of the rotary spring tensioner of FIG. 1 showing the collar lever arm positioned in the initial or starting orientation corresponding to belt cleaner blades of the belt cleaning apparatus having no or minimal wear and further showing an arcuate interface between a spring seat member of the spring device and a knuckle of the collar lever arm.

As shown in FIGS. 1, 2, 4-6 and 10-14, the spring seat member 40 is positioned on the spring rod 34, via a central through opening 40*a* thereof through which the rod 34 extends, to engage the lever arm 28. The spring seat member 40 includes a flat back surface 72 for being engaged by the spring member 16. Optionally, an adapter collar 74 can be positioned on the spring rod 34 intermediate the spring seat member 40 and the spring member 16, as shown in FIGS. 2 and 10. As shown in FIG. 4, the adapter collar 74 includes a shoulder 75 sized to correspond to the inner diameter 77 of the spring member 16 to be received within the end coil 16*a* of the spring member 16. The spring member 16 can be compressed against the spring seat member 40 by a compression member 76, such as a nut, threaded on corresponding threads of the spring rod 34. As shown in FIGS. 2, 4 and 10-14, an adjustment collar 78 is positioned on the spring rod 34 intermediate the spring member 16 and the compression nut 76 to provide a flat engagement surface 80 for engaging the spring member 16. Further, as with adapter collar 74, a shoulder 81 of the adjustment collar 78 is sized to correspond to the inner diameter 77 of the spring member 16 and be received within the end coil 80 of the spring member 16. The shoulders 75 and 81 of the adapter collars 74 and 78 act to limit movement of the spring member 16 to maintain engagement between the spring member 16 and the adapter collars 74 and 78. After the spring member 16 has been sufficiently compressed by tightening the compression nut 76, a locking member 82, such as a locking nut, can be threaded on the spring rod 34 adjacent to the compression nut 76 to resist back out of the compression nut 76.

As shown in FIG. 1, the elongate spring rod 34 can include a threaded portion 84 and a non-threaded portion 86 thereof. In particular, the non-threaded portion 86 is located adjacent the pivot block 64 and extends along the spring rod 34 so that the non-threaded portion 86 is received between the distal end arm portions 50 of the lever arm 28. The non-threaded portion 86 allows for low-friction engagement with the spring seat member 40 as the spring seat member 40 shifts along the spring rod 34. The threaded portion 84 allows for the use of threaded nuts 76 and 82 for compressing and securing the spring member 16 on the spring rod 34.

To secure the spring rod 34 between the free end portions 50 of the lever arm 28, the spring seat member 40 and the lever arm 28 have an arcuate interface 88 therebetween. As shown in FIGS. 2 and 4-14, the arcuate interface 88 includes convex surfaces 90 at either side of the free end portions 50 of the lever arm 28 and a concave surface 92 of the spring seat member 40. Alternatively, the free end portions 50 could include the concave surfaces with the spring seat member 40 having the convex surface (not shown). Alternatively, other arcuate interfaces are contemplated, including a spherical connection such as a ball and socket joint.

The concave and convex surfaces or arcuate surfaces 90 and 92 are configured to permit the lever arm 28 to rotate relative to the spring seat member 40 of the spring assembly 36. As shown in FIGS. 2 and 4-12, the concave surface 92 of the spring seat member 40 has a larger radius of curvature 94 than the radii of curvature 96 of the convex surfaces 90 of the free ends 50 of the lever arm 28. Exemplary radii of curvature with the pivotable connection 38 between the mounting bracket 20 and spring rod 34 range between 0.375 and 1.0. As shown in FIGS. 2 and 4-12, the concave surface 92 of the spring seat member 40 has a radius of curvature of 0.625 and the convex surfaces 92 of the lever arm 28 have radii of curvature of 0.6. The concave and convex surfaces 90 and 92 are configured to have the different radii of curvature 94 and for tolerance purposes and to ensure line contact and reduce friction therebetween as the lever arm 28 rotates relative to the spring seat member 40.

More particularly, the radii of curvature 94 and 96 are configured to permit the lever arm 28 to rotate or pivot during conveyor belt 24 operations while minimizing or reducing the movement of the spring seat member 40 and spring rod 34. As shown in FIGS. 2, 10 and 11, for a given thirty degree rotation of the elongate pole member 4 with the collar 26 secured thereon, the spring rod 34 will pivot over a range of less than about ten degrees over the operational range of the spring tensioner 6, or less than about one degree of spring rod 34 pivoting for every three degrees of elongate pole member rotation over the operational range of the spring tensioner 6. Preferably, the spring rod 34 pivots over a range of less than about seven degrees over the operational range of the spring tensioner 6. As a result, the pivotal movement of the spring rod 34 is reduced thereby reducing the overall operational volume or envelope occupied by the spring tensioner 6.

The operational volume or envelope is further reduced by configuring the spring tensioner 6 so that the angle between the spring force vector 108 and the lever arm axis 35 varies over the useful life of the blades 8 from an amount. less than ninety degrees to an amount greater than 90 degrees. For example, the angle between the spring force vector 108 and the lever arm axis 35 can range from 68 degrees to 94 degrees. As discussed above, the arcuate interface 88 allows the lever arm 28 to rotate independently of the spring seat member 40, thereby providing less angle variation between the lever arm axis 35 and the spring force vector 108 than the amount of rotation of the elongate pole member 4.

As a result of the angle between the lever arm axis 35 and the spring free vector 108 increasing from an amount less than 90 degrees to an amount larger than 90 degrees, the direction of pivoting movement of the spring rod 34 changes. More particularly, as the angle increases toward 90 degrees, the spring rod 34 moves away from the collar 26. However, after the angle between the lever arm axis 35 and spring force vector 108 increases beyond 90 degrees, the spring rod 34 begins to pivot back toward the collar 26, thereby reducing the operational envelope of the spring rod 34 of the spring tensioner 6.

Alternatively, with the spring rod 34 in a fixed position relative to the mounting bracket 20 as shown in FIGS, and 14, the spring rod 34 does not pivot during spring tensioner operations. To accommodate the fixed spring rod 34, the spring seat member 40 includes a grooved portion 146 sized significantly larger than the convex surfaces 90 of the lever arm free ends 50. As shown in FIGS. 13 and 14, the grooved portion 146 includes a flat surface portion 148 and curved portions 150. The curved portions 150 include radii of curvature 152 larger than the radii of curvature 96 of the convex surfaces 90 of the free ends 50 of the lever arm 28. In particular, the grooved portion 146 of the spring seat member 40 is sized and configured to allow the lever arm 28 to shift or travel along the flat surface portion 148 and rotate relative to the curved portions 150 of the grooved portion 146 of the spring seat member 40.

The spring seat member 40 further includes interfering potions 100 and 102 of the concave surface 92 to limit the movement of the free ends 50 therealong. In particular, the spring seat member 40 includes a pair of opposing interfering portions 100 and 102 of the concave surface 92 configured to extend along the lever arm free ends 50 to maintain the spring rod 34 in the desired orientation between the free ends 50 of the lever arm 28. As shown in FIGS. 2 and 4-14, the first interfering portion 100 of the concave surface 92 extends along a lower surface 104 of the enlarged end head 98 of the lever arm 28 so as to engage the lower surface 104 and resist pivoting of the spring rod 34 away from the lever arm 28. The second interfering portion 102 of the concave surface 92 is positioned opposite the first interfering portion 100, and is configured to engage an upper surface 106 of the enlarged head 98 of the lever arm 28. As a result, the second interfering portion 102 resists pivoting of the spring rod 34 toward the collar 26.

The configuration of the spring tensioner 6 of the present invention allows the elongate pole 4 with the collar secured thereto to rotate about thirty-five (35) degrees during operation with the first five (5) degrees accounted for by the initial flexing of the blades 8 as they engage the conveyor 24. As a result, recompressing of the spring 16 is only required to maintain the desired torque on the elongate pole 4 to bias the cleaning blades 8 against the conveyor belt 24. As noted above, recompressing the spring 16 includes tightening the compression nut 76 against the spring member 16 to compress the spring 16 against the spring seat member 40.

By providing a short, compact lever arm 28, the spring force 14 required to provide the desired torque is increased. To accommodate the shorter lever arm 28 and provide for rotation of the elongate pole 4 over the life of the blade 8, the pivot connection 60 between the spring rod 34 and the mounting bracket 20 is positioned close to the collar 26. However, in order to maintain the compact configuration of the spring tensioner 6 without requiring additional retensioning steps, the angle between the spring force vector 108 and the lever arm axis 35 ranges from 68 degrees to 94 degrees.

Alternatively, as a result of connecting the spring rod 34 to the mounting plate 20 by a fixed connection 70 as shown in FIGS. 13 and 14, the angle between the spring force vector 108 and the lever arm axis 35 changes in an amount equal to the angular rotation of the elongate member 4 over the life of the scraper blades 8. Thus, for example, if the elongate pole 4 rotates thirty (30) degrees over the operational range of the spring tensioner 6, the change of the angle between the spring force vector 108 and the lever arm axis 35 is also thirty (30) degrees.

The configuration of the lever arm 28 and the spring seat member 40 allows for easy and quick installation of the spring tensioner 6 unit. After the mounting bracket. 20 is securely mounted to conveyor frame structure 22 or other permanent structure positioned adjacent the edge of the conveyor belt 24, the collar 26 can be positioned so that the elongate pole 4 extends through the opening 110 of the collar 26. The collar 26 is shifted along the elongate pole 4 to a predetermined position adjacent the mounting bracket 20 and about the elongate pole 4 to a desired orientation of the collar 26 such that the scraper blades 8 of the cleaner assembly 2 engage the conveyor belt 24. Once in the desired location and orientation, the collar 26 can be positively secured to the elongate pole 4, such as by set screws 112.

As shown in FIGS. 2, 10 and 11, the collar 26 and mounting bracket 20 are configured to indicate the wear of the blades 8. In particular, the mounting bracket 20 includes a cut-out portion 114 including two spaced smaller cut-outs 116 and 118. The collar 26 includes a guide projection 120 extending in a direction opposite the lever arm 28. When new cleaner blades 8 are installed, the collar 26 is positioned on the elongate pole 4 so that the guide projection 120 is positioned adjacent a first cut-out 116. The second cut-out 118 is spaced from the first cut-out 116 so that the guide projection 120 of the collar 26 is positioned adjacent the second cut-out 118 when the scraper blades 8 has worn sufficiently to warrant replacement. Preferably, the cut-outs 116 and 118 are spaced to further accommodate for any initial bending or flexing of the blade 8 and belt 16 upon the initial installation. As shown, the cut-outs 116 and 118 provide for a thirty five degree rotation of the collar 26, with five degrees being associated with the initial flexing or bending during installation.

With the collar 26 secured in the desired location and orientation, the spring rod 34 of the spring mechanism 6 can be pivoted into the slot 52 between the free ends 50 of the lever arm 28. The connection device 38 for pivotably connecting the spring rod 34 to the mounting bracket 20 can be installed before or after the mounting bracket 20 is mounted.

Preferably, however, the connection device 38 is secured on the mounting bracket 20 before the bracket 20 is mounted on the conveyor frame structure 22. Further, the spring rod 34 is preferably secured to the connection device 38 before the bracket 20 is mounted. Preferably, the spring seat member 40, spring member 16 and spring compression member 76 are mounted on the spring rod 34, which is connected to the connection device 38, and in place before the collar member 26 is positioned on and secured to the elongate pole 4, and more preferably before the bracket 20 is mounted on the conveyor frame structure 22.

To assist in positioning the spring rod 34 between the lever arm free ends 50, the spring seat member 40 can include a chamfered edge portion 122. The chamfered edge 122 of the spring seat member 40 can act as a ramp to ease the shifting of the spring seat member 40 over the enlarged head 98 of the lever arm free ends 50. Additionally, the chamfered edge 122 reduces the profile of the spring seat member 40 thereby providing additional clearance between the spring seat member 40 and the outer surface 30 of the tubular portion 32 of the collar member 26.

Figure 3:
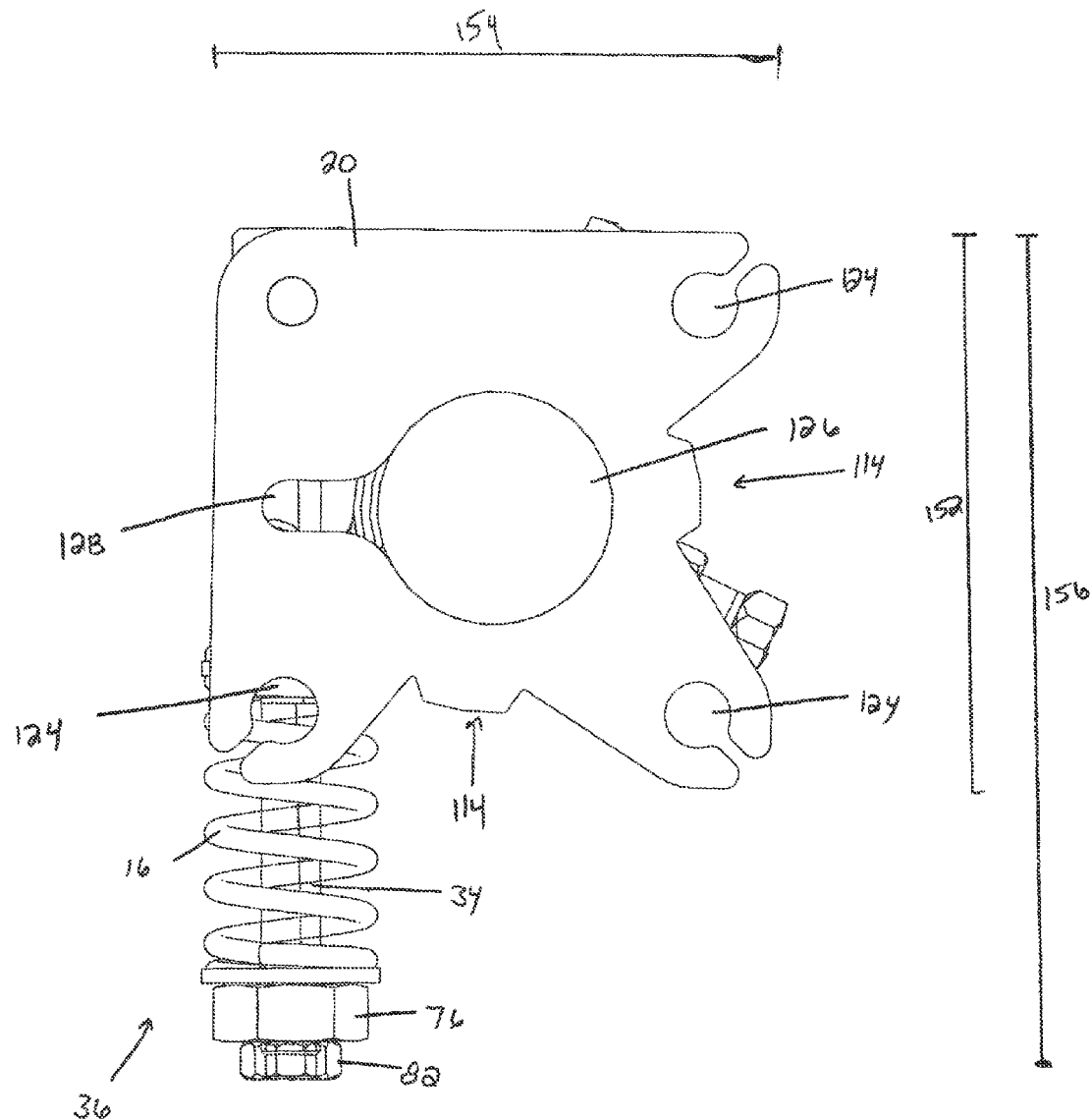
FIG. 3 is a back elevational view of the rotary spring tensioner of FIG. 1 showing a mounting bracket opening for receiving the elongate pole therethrough.

The securing or compressing member or nut 76 is turned to be threadingly advanced along the spring rod 34 to engage the spring member 16 and further compress the spring member 16 against the flat back surface 72 of the spring seat member 40. As shown in FIGS. 2-4, after the compressing nut 76 has been shifted to provide the desired spring compression, a locking member or nut 82 can be used to resist back-out of the compressing nut 76.

As shown in FIGS. 2 and 3, the mounting bracket 20 can include throughbores 124 therein for positively securing the mounting bracket 20 to the conveyor frame structure 22 as by fasteners extending therethough. Further, the mounting bracket 20 includes a central opening 126 sized for receiving the elongate pole 4 therethrough. As shown in FIG. 3, the opening 126 can include a slot 128 extending radially outward from the opening 126. The slot 128 is configured to accommodate a fin projection 130 of the elongate pole member 4. The fin projection 130 is configured to provide a mounting location for the belt scraper blades 8 which engage the conveyor belt surface 10. More particularly, the slot 128 allows an operator to remove the elongate pole 4 without having to remove mounting bracket 20 from the conveyor frame structure 22.

As shown in FIGS. 2 and 4-14, the collar member 26 is configured to be positioned on the ends of the elongate pole member 4. The collar member 26 includes an annular opening sized 110 to receive the elongate member 4 therein. More particularly, the opening 110 has a diameter 132 generally corresponding to the outer diameter 48 of the elongate support member 4. The collar member 26 is secured in a given orientation relative to the elongate support member 4 by a pair of set screws 112 which can be threaded into openings 134 of the collar member 26. Alternatively, other known devices or mechanisms for securing the collar member 26 to the elongate support member 4 are contemplated.

Further, depending on the application, the spring tensioning units 6 can be used on one or both sides of the conveyor belt 24. When a spring tensioning unit 6 is to be placed on both sides of the belt 24, one spring tensioning unit 6 needs to be configured in a first orientation 136 to provide a clockwise rotary force 138, while the other spring tensioning unit 6 needs to be configured in a second orientation 140 to provide a counter-clockwise rotary force 142. As shown in FIGS. 2 and 12, the spring tensioning units can be easily reconfigured from one orientation to the other.

In particular, to reorient the spring tensioner between the first and second orientations 136 and 140, the spring member 16 is decompressed to allow the spring rod 34 to be freely pivoted away from the collar member 26. With the spring rod 34 pivoted away from the collar member 26, and the collar member 26 not secured to the elongate pole member 4, the collar member 26 can be rotated about the elongate pole 4 while the spring rod 34 is pivoted about the pivot connection 38. More particularly, the collar 26 is rotated two hundred seventy (270) degrees from first orientation 136 so that the lever arm 28 is positioned adjacent to the pivot block 38. Note that depending on the original orientation of the spring tensioning unit 6 the collar 26 is rotated either clockwise or counter-clockwise. The spring rod 34 of the spring tensioning mechanism 36 can then be rotated about the pivot block 38 two hundred seventy (270) degrees in a direction opposite the rotation of the collar member 26. Thus, if the collar 26 was rotated counter-clockwise the spring tensioning mechanism 36 will be rotated clockwise and vice versa.

The spring tensioning mechanism 36 is pivoted until the rod 34 is received between the spaced arms 50 of the lever arm 28. To accommodate reorienting of the spring tensioner between providing clockwise and counterclockwise rotary forces, and vice versa, the enlarged end 98 of the lever arm 28 has a symmetrical configuration 144 to permit the spring force 14 to be applied to either opposing side thereof. Further, the concave surface 92 of the spring seat member 40 can engage the convex surfaces 90 on either side of the enlarged head 98 of the lever arm 28. With the spring rod 34, spring seat 40 and spring member 16 in place, the compression nut 76 is tightened to provide the desired spring compression, and the lock or set nut 82 is used to secure the tensioning nut 76 in place.

The spring tensioner 6 apparatus of the present invention further allows for easy replacement of belt scraper blades 8. Scraper blades 8 can be secured to the elongate pole 4 by a variety of mechanisms. Generally, however, the elongate pole 4 must be rotated so that the blades 8 are shifted away from the belt 24 so the old blades 8 can be removed and new blades 8 can be installed. In order to rotate the elongate pole 4 so the blades 8 can be removed, the spring member 16 on the spring rod 34 is decompressed so that the spring rod 34 can be pivoted out from between the free ends 50 of the lever arm 28. Preferably, the spring member 16 and securing nut 76 remain on the spring rod 34 during the replacement process.

With the spring rod 34 pivoted out from between the free ends 50, the elongate pole member 4, with the collar 26 secured thereto, is rotated to allow an operator to access the scraper blades 8 and remove the blades 8 from the elongate pole 4. Exemplary amounts of rotation of the elongate pole member 4 include at least about 93 degrees, and preferably about 180 degrees.

After the worn scraper blades 8 are removed, new blades 8 can be installed on the elongate pole 4 such as via the fin projection 130 thereof. The elongate pole 4 and collar 26 connected thereto are then rotated until the guide projection 120 of the collar 26 is positioned to point at the first cut out 116 of the mounting bracket 20 as previously discussed. The spring rod 34 is then pivoted about the pivot connection 38 so that the spring rod 34 is received between the free ends 50 of the lever arm 28. The spring member 16 can then be compressed against the spring seat member 40 by tightening the securing nut 76 so that the belt cleaner scraper blades 8 are biased against the conveyor belt 24.

Preferably, during the removal and installation of new belt cleaner blades 8, the spring assembly 36 is not disassembled or disconnected from the mounting bracket 20. Rather, the spring assembly 36 is reconfigured to decompress the spring member 16 to permit the spring rod 34 to pivot out from and back between the lever arm free ends 50.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A spring tensioner apparatus for a conveyor belt cleaner, the spring tensioner comprising:
a mounting plate;
an annular collar for being secured to an elongate pole to which the conveyor belt cleaner is mounted;
a lever arm connected to the collar and extending radially away therefrom;
a spring assembly for applying a bias force to the lever arm which generates a rotary bias force on the collar;
an elongate rod for carrying the spring assembly thereon;
an arcuate interface between the spring assembly and the lever arm to limit pivoting of the elongate rod for a given amount of rotation of the collar during conveyor belt operation, the arcuate interface comprising curved surfaces of the spring assembly and the lever arm in engagement with each other; and
a fixed pivot connection between an end of the elongate rod and the mounting plate so that the rod only undergoes the limited pivoting thereof during conveyor belt operation and does not translate relative to the plate.

2. The spring tensioner apparatus of claim 1 wherein the spring assembly includes a spring seat with the arcuate interface being between the spring seat and the lever arm.

3. The spring tensioner apparatus of claim 1 wherein the lever arm includes split lever arm portions having free ends that are spaced from one another.

4. The spring tensioner apparatus of claim 1 wherein the arcuate interface includes an enlarged end portion of the lever arm on which the lever arm curved surface is formed.

5. The spring tensioner apparatus of claim 4 wherein the spring assembly includes a spring and a seat for the spring with the seat having a concave curvature along which the spring assembly curved surface extends and the lever arm enlarged end portion having a convex curvature on which the lever arm curved surface is formed to form the arcuate interface therebetween.

6. The spring tensioner apparatus of claim 1 wherein the limited pivoting of the elongate rod is less than about 10 degrees during conveyor belt operation.

7. The spring tensioner apparatus of claim 6 wherein the limited pivoting of the elongate rod is less than about 7 degrees during conveyor belt operation.

8. The spring tensioner apparatus of claim 1 wherein the elongate rod pivots less than about 1 degree about the fixed pivot connection for every 3 degrees of rotation of the collar during conveyor belt operation.

9. A spring tensioner apparatus for a conveyor belt cleaner, the spring tensioner comprising:
a mounting plate;
an annular collar for being secured to an elongate pole to which the conveyor belt cleaner is mounted;
a lever arm connected to the collar and extending radially away therefrom;
a spring assembly for applying a bias force to the lever arm which generates a rotary bias force on the collar;
an elongate rod for carrying the spring assembly thereon;
an arcuate interface between the spring assembly and the lever arm to limit pivoting of the elongate rod for a given amount of rotation of the collar during conveyor belt operation; and
a fixed pivot connection between an end of the elongate rod and the mounting plate so that the rod only undergoes the limited pivoting thereof during conveyor belt operation and does not translate relative to the plate, wherein the pivot connection comprises a pivot block pivotably mounted to the mounting plate with the end of the elongate rod connected thereto.

10. A spring tensioner apparatus for providing torque to an elongate pole of a belt cleaner, the spring tensioner apparatus comprising:
a bracket for being mounted to a conveyor frame structure;
a collar member for being secured to an end of the elongate pole member;
a split lever arm having opposite, spaced lever arm portions extending away from the collar;
a slot between the spaced lever arm portions having an open distal end at distal ends of the lever arm portions;
a rod member configured to be received between the spaced lever arm portions;
a pivot connection between the bracket and the rod member to allow the rod member to pivot thereabout into the slot between the spaced lever arm portions and out therefrom;
a spring seat member mounted on the rod member and configured to engage the distal ends of the spaced lever arm portions with the rod member positioned between the spaced lever arm portions;
a spring member mounted on the rod member and against the spring seat member for urging the spring seat member into engagement with the distal ends of the lever arm portions;
an arcuate interface between the spaced distal ends and spring seat member that allows the lever arm portions and the spring seat member to shift along a curved path relative to one another; and
an interfering portion of the spring seat member oriented to extend along the spaced distal ends of the lever arm portions to keep the rod member in the slot therebetween against pivoting out therefrom.

11. The spring tensioner apparatus of claim 10 wherein the spring seat member has an opposing interfering portion that extends along the spaced lever arm portions to keep the spring seat member from engaging the collar member.

12. The spring tensioner apparatus of claim 10 wherein the spring seat member includes a concave surface and the spaced lever arm portions each include a convex surface to form the arcuate interface therebetween.

13. A spring tensioning assembly of a belt cleaning mechanism for providing torque to an elongate pole member extending below a conveyor belt, the spring tensioning assembly comprising:
a bracket for being mounted to a conveyor frame structure;
a lever arm device configured for being mounted to the elongate pole member;
a spring member for applying a bias force to the lever arm device;
a spring rod to which the spring member is mounted;
a first orientation of the lever arm device, spring rod and spring member to provide a clockwise rotary force on the pole;
a second orientation of the lever arm device, spring rod and spring member to provide a counterclockwise rotary force on the pole; and a pivot connection between the spring rod and the bracket for pivoting the spring rod between the first and second orientations without requiring removal of the spring member from the spring rod.

14. The spring tensioning assembly of claim 13 wherein the lever arm device includes spaced arm end portions extending generally radially away from the elongate pole member for receiving the spring rod therebetween in the first and second lever arm orientations.

15. A method of installing a spring tensioning apparatus for a belt cleaner, the method comprising:
pivotably connecting an elongate spring mount to a mounting bracket;
securing the bracket to a conveyor frame structure;
mounting a collar having an open-ended split lever arm to an elongate mounting pole for the belt cleaner with the open-ended split lever arm having a pair of spaced free end portions having a slot therebetween including an open end at ends of the spaced free end portions; and
pivoting the elongate spring mount through the open end of the split lever arm into the slot thereof.

16. The method of claim 15 wherein the elongate spring mount has a spring mounted thereon and is pivotably connected to the mounting bracket before the bracket is secured to the conveyor frame structure so that pivoting the elongate spring mount through the open end of the split lever arms occurs with the spring mounted thereon.

17. The method of claim 15 further including compressing a spring on the spring mount against the lever arm to bias the belt cleaner against the conveyor belt.

18. A method of replacing scraper blades secured to an elongate pole, the method comprising:
decompressing a spring mechanism of a spring tensioner;
pivoting the decompressed spring mechanism away from a lever arm secured to the elongate pole; and
rotating the elongate pole having the lever arm secured thereto so that the scraper blades mounted on the elongate pole shift away from the belt to allow for removal of the scraper blades.

19. The method of claim 18 wherein the spring mechanism is pivotably connected to a mounting plate to be pivotable relative thereto and further including the steps:
removing the used scraper blades from the elongate pole;
installing new scraper blades on the elongate pole;
rotating the elongate pole having the lever arm secured thereto so that the belt scraper blades mounted on the elongate pole shift toward the belt, wherein each of the removing, installing and rotating steps occur with the spring mechanism still pivotably connected to the mounting plate;
pivoting the pivotably connected decompressed spring mechanism toward the lever arm; and
compressing the spring mechanism against the lever arm to bias the belt cleaner against the conveyor belt.

20. The method of claim 18 wherein the spring mechanism includes a spring rod pivotably connected to a mounting plate and a spring mounted thereon for being compressed against the lever arm, wherein each of the decompression, pivoting and rotating steps occur with the spring mounted on the spring rod.

21. A spring tensioner apparatus for providing torque on an elongate pole of a belt cleaner, the spring tensioner mechanism comprising:
a short, compact lever arm device for being mounted to and for extending radially away from the elongate pole member, the short, compact lever arm device including a tubular portion having an inner diameter sized for fitting about the elongate pole member, and a lever arm extending radially outward from the tubular portion to a distal end thereof for a distance that is less than the tubular portion inner diameter;
a spring bias assembly configured to exert a predetermined, large bias force on the short, compact lever arm device for providing torque on the elongate pole; and
an enlarged end portion of the lever arm for receiving the predetermined, large bias force applied by the spring bias assembly.

22. A spring tensioner for a conveyor belt cleaner, the spring tensioner comprising:
a mounting plate;
a collar for being secured to an elongate pole to which the conveyor belt cleaner is mounted;
a lever arm connected to the collar and extending radially away therefrom;
a spring assembly for applying a bias force to the lever arm which generates a rotary bias force on the collar;
an elongate rod for carrying the spring assembly thereon;
an adjustment interface between the spring assembly and the lever arm to allow the lever arm to shift or rotate relative to the spring assembly during conveyor belt operation; and
a fixed connection between an end of the elongate rod and the mounting plate so that the rod does not pivot or translate relative to the plate during conveyor belt operation.

* * * * *